United States Patent
Bogart et al.

(10) Patent No.: US 6,173,053 B1
(45) Date of Patent: *Jan. 9, 2001

(54) OPTIMIZING CALL-CENTER PERFORMANCE BY USING PREDICTIVE DATA TO DISTRIBUTE CALLS AMONG AGENTS

(75) Inventors: Frank J. Bogart, Boulder; Andrew D. Flockhart, Thornton, both of CO (US); Robin H. Foster, Little Silver, NJ (US); Joylee E. Kohler, Northglenn, CO (US); Eugene P. Mathews, Barrington, IL (US); Stephen L. Skarzynski, Niwot, CO (US)

(73) Assignee: Avaya Technology Corp., Miami Lakes, FL (US)

( * ) Notice: Under 35 U.S.C. 154(b), the term of this patent shall be extended for 0 days.

This patent is subject to a terminal disclaimer.

(21) Appl. No.: 09/057,842

(22) Filed: Apr. 9, 1998

(51) Int. Cl.[7] .................................................. H04Q 3/64
(52) U.S. Cl. ........................ 379/266; 379/265; 379/309
(58) Field of Search ................................. 379/265, 266, 379/309, 211

(56) References Cited

U.S. PATENT DOCUMENTS

| | | | |
|---|---|---|---|
| 4,567,323 | * 1/1986 | Lottes et al. | 379/266 |
| 5,206,903 | 4/1993 | Kohler et al. | 379/309 |
| 5,291,550 | 3/1994 | Levy et al. | 379/242 |
| 5,299,260 | 3/1994 | Shaio | 379/265 |
| 5,309,513 | 5/1994 | Rose | 379/265 |
| 5,335,269 | 8/1994 | Steinlicht | 379/266 |

(List continued on next page.)

FOREIGN PATENT DOCUMENTS

| | | | |
|---|---|---|---|
| WO9209164A | 5/1992 | (EP) | H04M/3/00 |
| 0740450A2 | 10/1996 | (EP) | H04M/3/50 |
| 0817455A2 | 1/1998 | (EP) | H04M/3/50 |

OTHER PUBLICATIONS

Kerry W. Hassler, et al. "Revolutionizing DEFINITY® Call Centers in the 1990s", *AT&T Technical Journal*, vol. 74, No. 4, Jul./Aug. 1995, pp. 64–73.

DEFINITY® Communications System Generic 3, Call Vectoring/Expert Agent Selection (EAS) Guide, AT&T, 555–230–520, Issue 3, Nov. 1993, pp. 1–1—1–10, 2–1—2–22, 3–1—3–15, and 8–1—8–24.

* cited by examiner

*Primary Examiner*—Krista Zele
*Assistant Examiner*—William J. Deane, Jr.
(74) *Attorney, Agent, or Firm*—David Volejnicek

(57) ABSTRACT

Selection of a call-center agent (106–108) to handle a call is based on which available agent's handling of the call will tend to optimize call-center performance criteria such as efficiency (e.g., minimize per-call handling time) or derived benefit (e.g., maximize revenue). Each agent has a service profile for each type of call that they handle. A service profile (400–402) comprises present values of a plurality of service metrics, such as proficiency, profitability, customer satisfaction, and agent satisfaction. When a call of a particular type becomes available, the present values of the service metrics of the service profile (400–500) of that call type of each agent who is available to handle the call are combined (304) into a score according to one of a plurality of formulas which corresponds to that call type, and the agent with the best score is assigned (306) to the call. When the assigned agent finishes handling the is call, his or her performance is evaluated (202–206) based on the service metrics, and the valuations are used (210) to revise the present values of the service metrics of that agent's service profile. The revision process gives (208) more weight to valuations of more-recently-handled calls to reflect both long-term and short-term agent performance trends and variations.

14 Claims, 4 Drawing Sheets

U.S. PATENT DOCUMENTS

| | | |
|---|---|---|
| 5,467,391 | 11/1995 | Donaghue, Jr. et al. ............ 379/265 |
| 5,537,470 | 7/1996 | Lee ........................................ 379/266 |
| 5,546,452 | 8/1996 | Andrews et al. .................... 379/219 |
| 5,684,872 | 11/1997 | Flockhart et al. ................... 379/266 |
| 5,818,907 * | 10/1998 | Maloney et al. ..................... 379/265 |
| 5,825,869 * | 10/1998 | Brooks et al. ....................... 379/265 |
| 5,903,641 * | 5/1999 | Tonisson .............................. 379/266 |
| 5,943,416 * | 8/1999 | Gisby ................................... 379/265 |

OPTIMIZING CALL-CENTER PERFORMANCE BY USING PREDICTIVE DATA TO DISTRIBUTE CALLS AMONG AGENTS

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer-specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls waiting to be handled.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories (splits) based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call should be handled by an agent who either has the ability to produce the most revenue or can handle the call in the shortest amount of time. Also, when an agent becomes available to handle a new call, the agent should handle either the call that has the possibility of generating the most revenue or the call which the agent is most efficient in handling. A telephone call-handling system having such functionality is disclosed in U.S. Pat. No. 5,299,260. However, this system is limited in its capabilities to truly maximize call center performance: it permits only one criterion or metric to be used at any one time to select an agent for handling an individual call, while call center performance is typically a multi-faceted function that involves a number of criteria or metrics.

SUMMARY OF THE INVENTION

This invention is directed to solving these and other problems of the prior art. According to the invention, a call handler (e.g., a call center agent) is selected for a call as follows. When a call of an individual one of a plurality of types (e.g., an inquiry call, a service call, a sales call, or a call needing a particular agent skill for its handling) becomes available, an available call handler who has a best present performance characteristic for that individual call type, is selected to handle the call. The determination of which available call handler has the best performance characteristic is made as follows. A service profile comprising present values of a plurality of service metrics for the individual call type is maintained for each agent. For each agent who is available to handle a call of the individual type, the present values of the plurality of service metrics are retrieved from the agent's service profile and are used in one of a plurality of formulas, each corresponding to a different call type, which corresponds to the individual call type to obtain a performance characteristic score for each of the available agents. Then the one of the available agents who has the best score is selected to handle the call. When the selected call handler finishes handling the call, the call handler's performance in handling the call is evaluated (quantitatively and/or qualitatively), and the present values of the call handler's service metrics are modified by the valuation to obtain new present values of the service metrics for the individual call type for the call handler. Preferably, the modifications are weighted to give more weight to performance evaluations of calls most-recently handled by this call handler. Then for subsequent calls of the individual type, the new present values of the service metrics of the call handler are used in selecting a call handler for the call, until that call handler is again selected and the above procedure is repeated. Also, for calls of other types, the call handlers' performance characteristic scores for those other call types are used in selecting call handlers for the calls.

While the method comprises the steps of the just-characterized procedure, the apparatus effects the method steps. The apparatus preferably includes an effector—any entity that effects the corresponding step, unlike a means—for each step. Further, there is preferably provided a computer-readable medium containing software which, when executed in a computer, causes the computer to perform the method steps.

The invention tends to maximize call center performance. For example, when a new call arrives, it goes to an agent who has the best ability to maximize call center performance as measured by a plurality of metrics. Also, when an agent becomes available to handle a new call, the agent is assigned to a call of a type from which this agent can maximize call center performance as measured by the plurality of metrics. This allows for a multi-dimensional, and hence more accurate or refined, measure of call center performance. The invention takes into consideration each agent's historical performance for each call type that the agent handles. Yet, by revising the values of the agent's metrics at the end of every call handled by the agent, the invention automatically adjusts for long-term trends, such as the agent gaining experience and expertise, and short-term trends, such as the agent having "a bad day".

These and other features and advantages of the invention will become more apparent from the following description of an illustrative embodiment of the invention considered together with the drawing.

DETAILED DESCRIPTION

Figure 1:
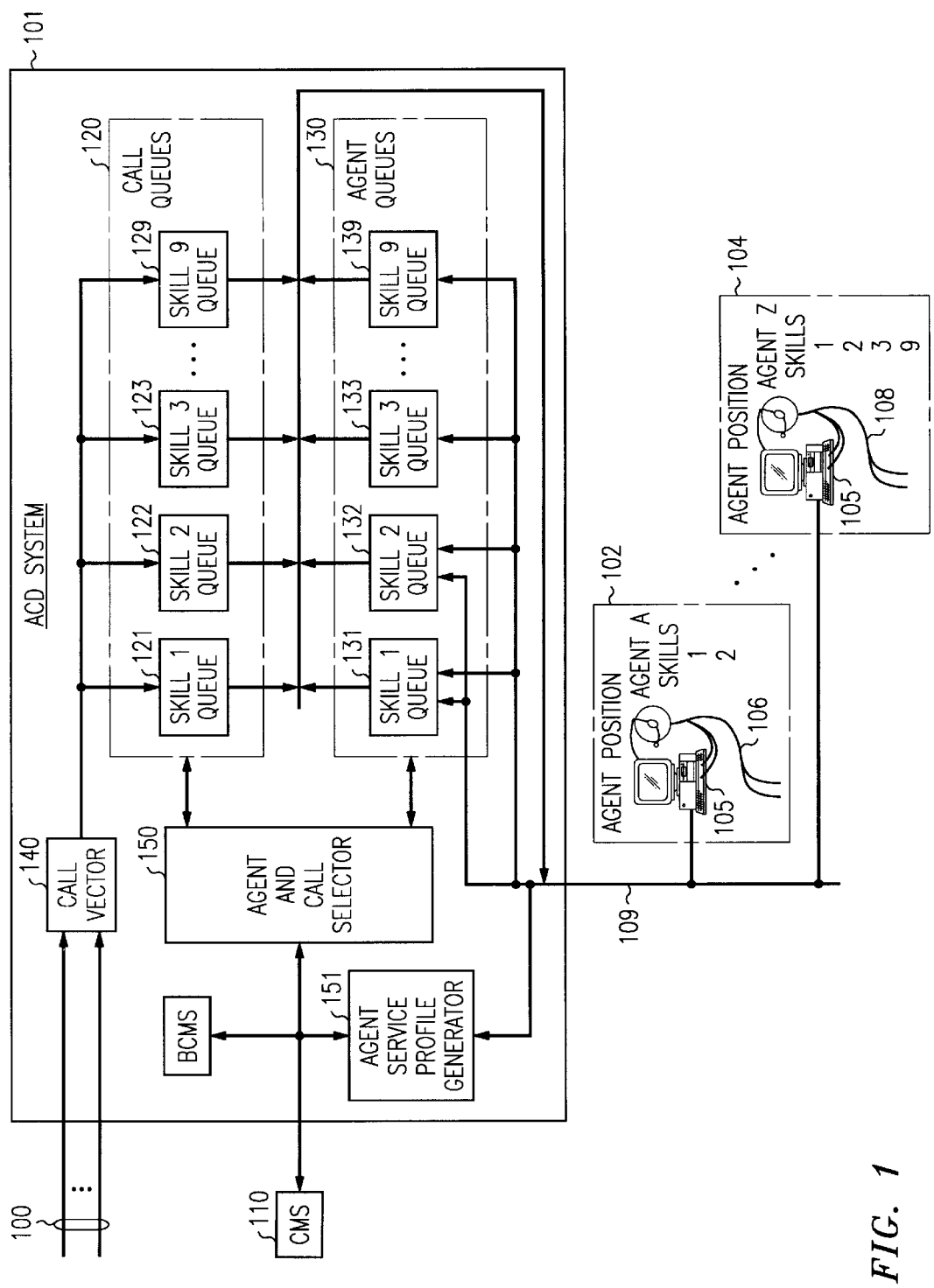
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic call-distribution functionality. Included among the data stored in ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 is a call vector 140. Calls incoming to the call center on lines or trunks 100 are assigned by call vector 140 to different call queues 121–129 based upon the agent skill that they require for their proper handling. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, Nov. 1993). Skills-based ACD is described in further detail in U.S. Pat. No. 5,206,903.

According to the invention, included among the programs executing on ACD system 101 are an agent and call selector 150 and an agent service-profile generator 151. Selector 150 and generator 151 are stored either in the main memory or in a peripheral memory (e.g., disk, CD ROM, etc.) or some other computer-readable medium of ACD system 101. Selector 150 and generator 151 effect an assignment between available calls and available agents in a way that tends to maximize the efficiency of the call center.

Figure 2:
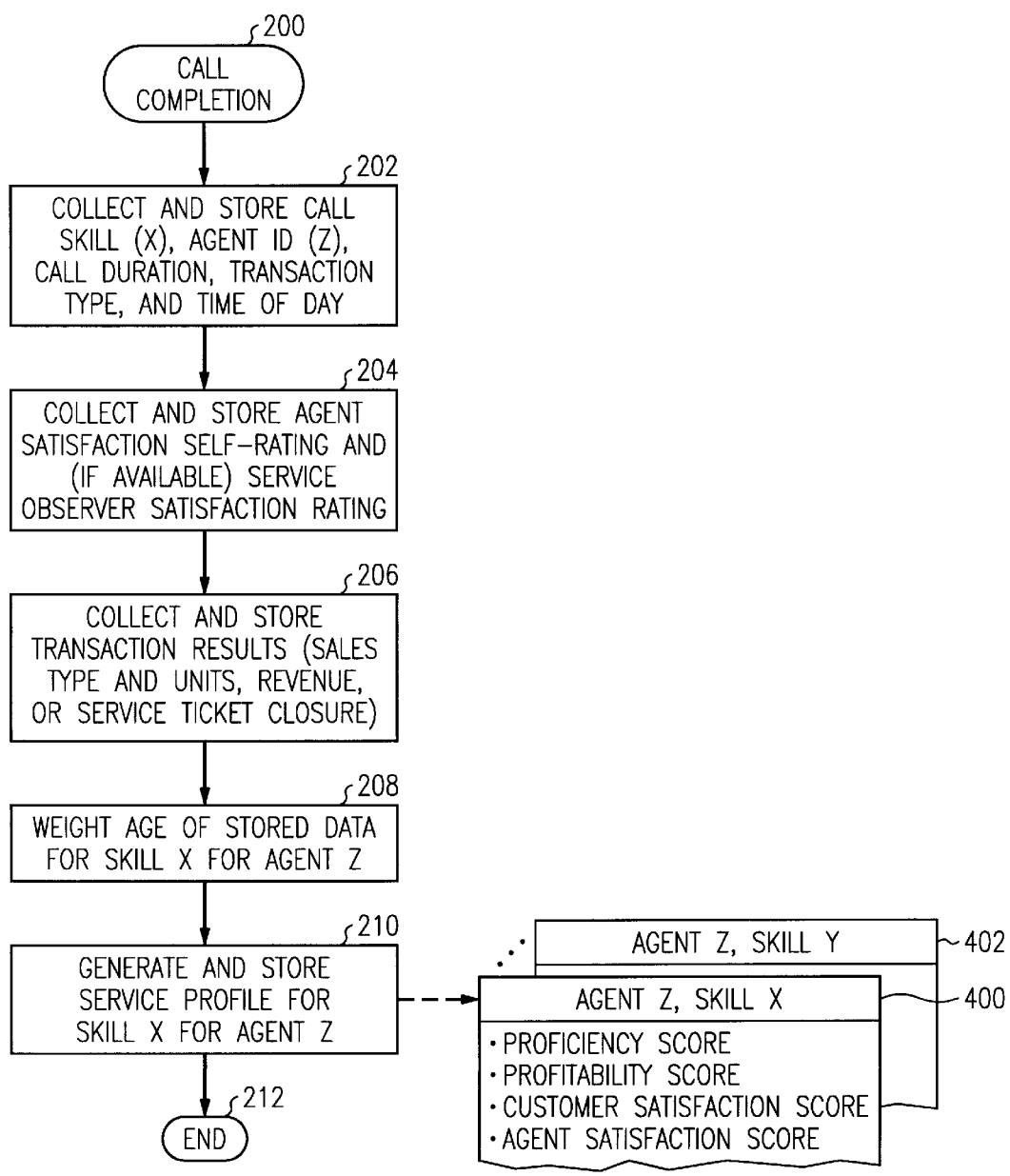
FIG. 2 is a flow diagram of operations performed by an agent service profile generator of the call center of FIG. 1.

The functionality of generator 151 is shown in FIG. 2. At the completion of handling of each call, at step 200, generator 151 collects efficiency metrics for the call, at steps 202–206. From the PBX on which ACD system 101 is based, generator 151 collects data such as the skill (X) involved in handling the call, the identifier of the agent (Z) who handled the call, the call duration, the transaction type (e.g., catalog sale, information request, complaint, etc.) and the time-of-day, and stores this information in a database, such as CMS 110, at step 202. From the agent's terminal 105, generator 151 collects and stores the agent's self-rating (which the agent entered on his or her terminal) of how the agent is satisfied with how he or she handled the call, at step 204. Also, if the handling of the call was observed by a service observer (e.g., either was monitored by a supervisor of the call center, or the non-agent party involved in the call was queried by an interactive voice response system for an evaluation of the service received), generator 151 collects and stores the service observer's satisfaction rating, also at step 204. From the agent's terminal 105 (or from a host computer to which the agents terminal 105 reports transaction data), generator 151 collects and stores the transaction results (e.g., type of sale and number of units sold, or revenue generated, or service ticket closure or escalation, etc.), depending on the transaction type, at step 206. Generator 151 then weights the age of the stored data for skill X for agent Z for this call and previous calls, at step 208. Weighting favors data obtained from most-recent calls over data obtained from calls in the more-distant past. This enables the weighting to strongly reflect present agent performance, as agent performance may change over time due to, for example, an agent becoming more proficient, or "burned out", or having a "good day" or a "bad day". For example, the agent's data from handling all previous calls of skill X is given a weight of 75%, and the data from the just-completed call is given a weight of 25%. Generator 151 then uses the weighted data to generate, or regenerate, a service profile 400 for skill X for agent Z, at step 210. A service profile is a set of scores for a set of metrics, e.g., a proficiency score, a profitability score, a customer satisfaction score, and an agent satisfaction score. ACD system 101 has a profile for each skill of each agent. Therefore, there typically exists a plurality of profiles 400–402 for each agent. Generator 151 stores the generated service profile 400 along with the agent's other profiles in a database such as CMS 110, at step 210, and then ends its operation, at step 212.

Figure 3:
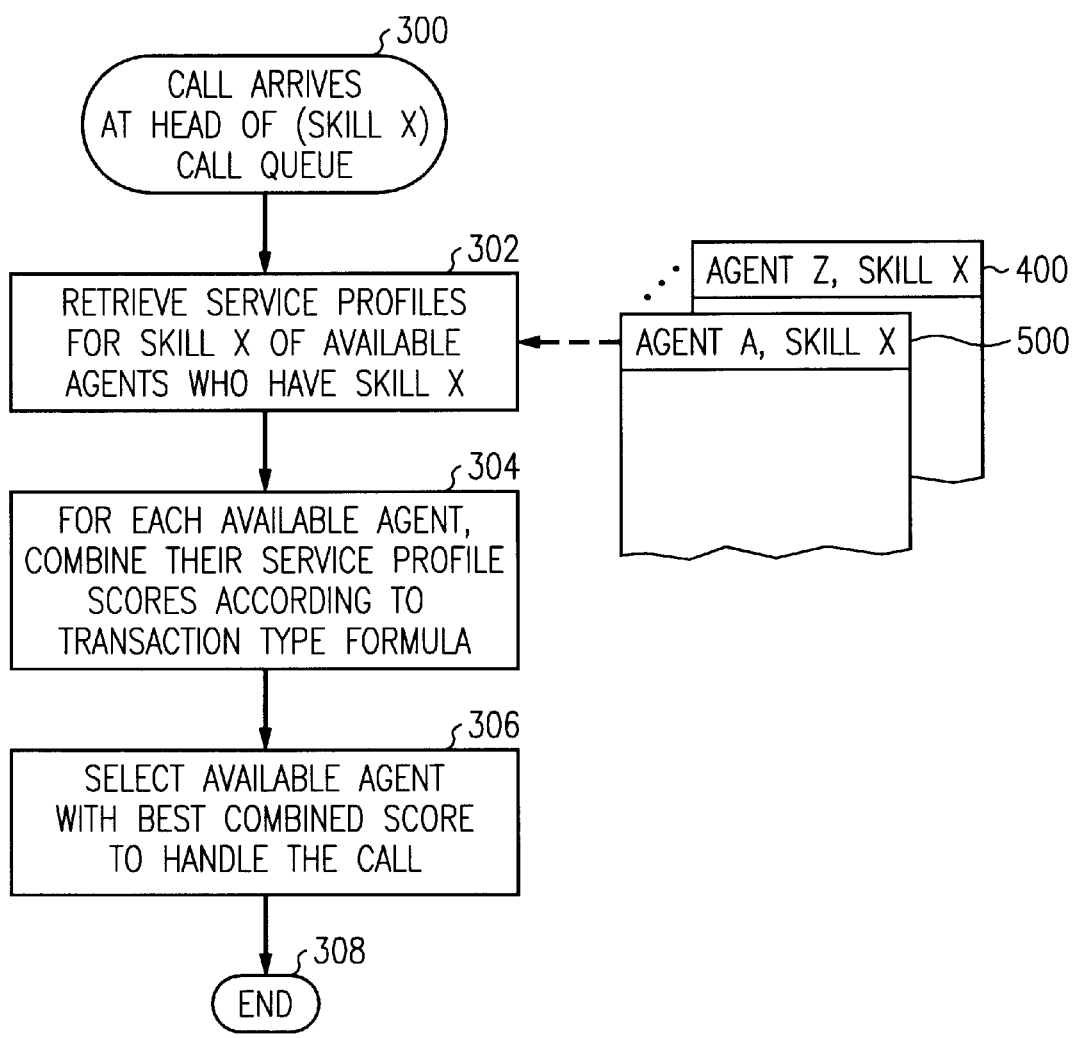
FIG. 3 is a flow diagram of agent-selection operations performed by an agent and call selector of the call center of FIG. 1.

The functionality of agent and call selector 150 in selecting an agent for a call is shown in FIG. 3. Upon arrival of a call at the head of one of the call queues 120 (e.g., a skill X call queue), at step 300, selector 150 retrieves the service profiles 400–500 for skill X of all agents who are available to handle the call and who have skill X, at step 302. Preferably, at step 302 selector 150 retrieves the service profiles not only for agents who are actually idle and enqueued in the skill X agent queue, but also for those agents who ACD system 101 anticipates will become idle within a predetermined amount of time (e.g., a few seconds). Then, for each of the agents whose service profile it retrieved at step 302, selector 150 combines the agent's service profile scores according to a formula which is a function of the transaction type represented by the arrived call, at step 304. The formula for each call type is administered (programmed) into the system and may be either algorithm-based (procedural) or rules-based (expert system engine). Each formula weights the agent's individual service profile scores based on the type of transaction represented by the arrived call. For example, in a complaint transaction, the service observer satisfaction rating is weighted heavily, whereas in a sales transaction the revenue is weighted heavily, and in an information request transaction the proficiency is weighted heavily. On the other hand, the formula for a VIP sales call (a sales call from a preferred customer) may weigh profitability less than customer satisfaction, in contrast to a "standard" sales call. Selector 150 then selects the agent who has the best (highest) combined score to handle the call, at step 306. Optionally, selector 150 selects none of the available agents if none of the agents' combined scores reach a predetermined minimum threshold, and leaves the call waiting in queue for another agent to become available. Selector 150 then ends its operation, at step 308.

Figure 4:
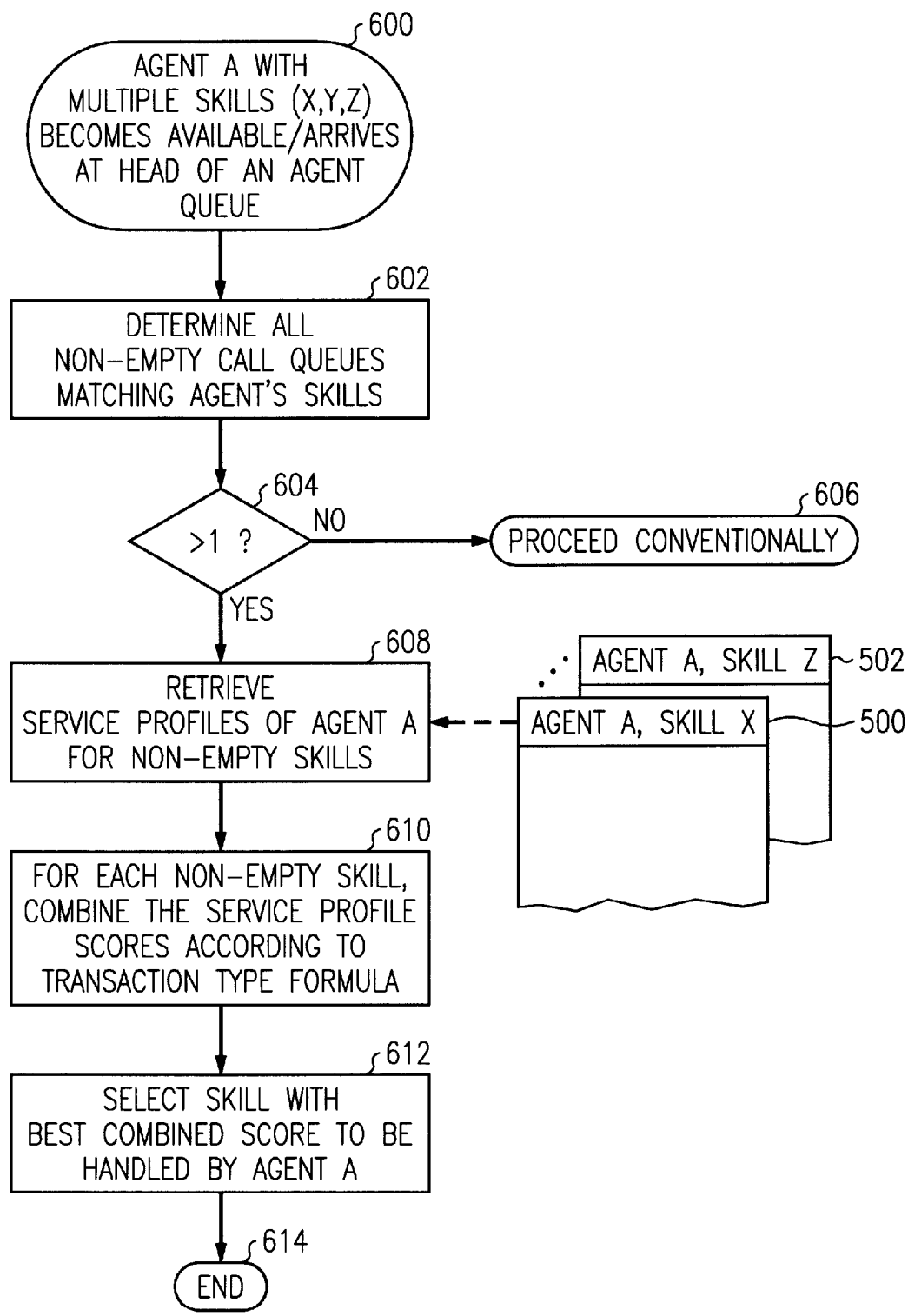
FIG. 4 is a flow diagram of call-selection operations performed by the agent and call selector of the call center of FIG. 1.

The functionality of agent and call selector 150 in selecting a call for an agent is shown in FIG. 4. Upon an agent becoming available or arriving at the head of one of the agent queues 130, at step 600, selector 150 determines which skills this idle agent possesses (e.g., skills X, Y, and Z) and which of those skills have non-empty corresponding call queues 121–129, at step 602. If the number of non-empty corresponding call queues 121–129 is none or one, as determined at step 604, selector 150 proceeds conventionally, at step 606, either enqueuing or leaving the idle agent enqueued in those agent queues 131–139 that correspond to the idle agent's skills if there are no non-empty corresponding call queues, or assigning a call from the one non-empty corresponding call queue to the idle agent and dequeuing the idle agent from all agent queues 130. If selector 150 determines at step 604 that there is a plurality of non-empty corresponding call queues 121–129, selector 150 retrieves the service profiles 500–502 of the idle agent for those skills that correspond to the non-empty call queues 121–129, at step 608. Then, for each of those skills' service profiles, selector 150 combines the service profile scores according to a formula which is a function of the transaction type represented by a call of that skill, at step 610. As was already stated in conjunction with FIG. 3, the formula for each call type is administered (programmed) into the system and may be either algorithm-based (procedural) or rules-based (expert system engine). Selector 150 then selects a call of the skill that has the best (highest) combined score to be handled by the idle agent, at step 612. Optionally, selector 150 selects none of the available calls if none of the agent's combined scores reach a predetermined minimum threshold, and leaves the agent waiting in queue for a call of another skill type to become available. Selector 150 then ends its operation, at step 614.

Of course, various changes and modifications to the illustrative embodiment described above will be apparent to those skilled in the art. For example, the loci of various data and functions are not important and may be changed at will; for example, skill and agent profiles and the agent service profile generator and the agent selector may be located in an adjunct processor. Nor do the profiles need to be updated in real time; such updating may be done only periodically. Also, the call queues and the agent queues may be distributed across a network of multiple ACDs. In this case, preference to distribute calls to other ACDs' agents may affect individual agent profiles, such as when one ACD site is presently working on an overtime-basis while another ACD site is in a different time zone and presently working standard hours. Or, profile weighting can vary depending on present business needs or priorities derived from some external source of customer information. Moreover, if the overall proficiency of a set of agents is judged to need improvement, the agents may be given remedial training, and upon their return to active duty, agents with lower proficiency values may be selected to provide immediate opportunities to apply the remedial training. Also, the service profile scores of all agents may be compared, and the call may remain enqueued if an agent with a high-enough service profile score is predicted to become available shortly. Furthermore, the system may dynamically change the weighting of individual profile scores or even the score-combining formula to reflect present operating conditions of the call center. Such changes and modifications can be made without departing from the spirit and the scope of the invention and without diminishing its attendant advantages. It is therefore intended that such changes and modifications be covered by the following claims.

What is claimed is:

1. A method of selecting a call handler to handle a call, comprising the steps of:

a) in response to availability of a call of an individual one of a plurality of types, selecting an available one of a plurality of call handlers who has a best performance characteristic score for the individual call type, to handle the call, including retrieving from a service profile comprising present values of a plurality of service metrics for the individual call type for each agent who is available to handle a call of the individual type the service metrics for the individual call type;

obtaining a performance characteristic score for each of said available agents by using the retrieved present values of the plurality of service metrics of each said available agents in one of a plurality of formulas, each corresponding to a different call type, that corresponds to the individual call type, and selecting one of the available agents who has a best said score to handle the call;

b) in response to completion of handling of the call by the one call handler, evaluating the one call handler's performance in handling the call; and c) modifying the values of the one call handler's service metrics for the individual call type by the valuation of the one call handler's performance in handling the call to obtain new present values of the service metrics for the individual call type for the one call handler.

2. The method of claim 1 wherein:

the step of obtaining comprises the step of combining the retrieved values of the plurality of service metrics of the service profile of each said available agent according to said one formula into the score.

3. The method of claim 2 wherein:

the step of evaluating comprises the step of measuring individual said service metrics of the service profile of the one call handler in handling the call, to obtain measured values;

the step of modifying comprises the steps of combining the measured values of the service metrics with the values of the service metrics of the service profile to obtain new values of the service metrics of the service profile.

4. The method of claim 3 wherein:

the step of combining comprises the steps of weighting the measured values of the service metrics relative to the values of the service metrics of the service profile; and combining the weighted measured values with the values of the service metrics of the service profile to obtain new values of the service metrics of the service profile.

5. The method of claim 1 wherein:

the performance characteristic score indicates efficiency of the one call handler in handling a call of the individual type.

6. The method of claim 1 wherein:

the performance characteristic score indicates benefit generated by the call handler in handling a call of the individual type.

7. The method of claim 6 wherein:

the benefit comprises revenue.

8. The method of claim 1 wherein:

the service metrics of the service profile comprise at least one of efficiency, generated benefit, customer satisfaction, and call handler satisfaction.

9. An apparatus that performs the method of claim 1 or 2 or 3 or 4 or 5 or 6 or 7 or 8.

10. A computer readable medium containing software which, when executed in a computer, causes the computer to perform the steps of claim 1 or 2 or 3 or 4 or 5 or 6 or 7 or 8.

11. The method of claim 1 wherein:

the step of selecting comprises the steps of computing a call score for said individual call type, and selecting one of the available agents whose performance characteristic score best matches the call score of said call type.

12. The method of claim 1 wherein:

the step of selecting comprises the steps of computing a call score for the call of the individual call type, and selecting one of the available agents whose performance characteristic score best matches the call score.

13. A method of selecting a call handler to handle a call, comprising the steps of:

in response to availability of a call of an individual one of a plurality of types, selecting an available one of a plurality of call handlers who has a best performance characteristic score for the individual call type to handle the call, including retrieving from a service profile, comprising present values of a plurality of service metrics for the individual call type for each agent who is available to handle a call of the individual type, the service metrics for the individual call type;

obtaining a performance characteristic score for each of said available agents by combining the retrieved present values of the plurality of service metrics of each said available agent;

obtaining a call score for the call by combining present values of a plurality of characteristics of the call; and selecting one of the available call handlers who has a characteristic score that best corresponds to the call's score to handle the call.

14. The method of claim 13 wherein:

the step of obtaining a performance characteristic comprises the step of using the retrieved present values of the plurality of service metrics of each said available agent in one of a plurality of formulas, each corresponding to a different call type, that corresponds to the individual call type.

* * * * *